July 7, 1931.  J. S. BURDICK  1,812,858
FASTENER FOR DOORS AND THE LIKE
Filed Dec. 17, 1927  2 Sheets-Sheet 2
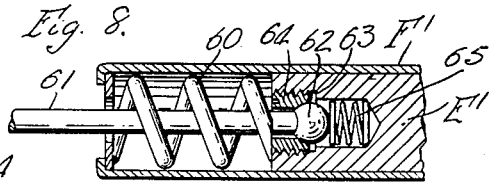
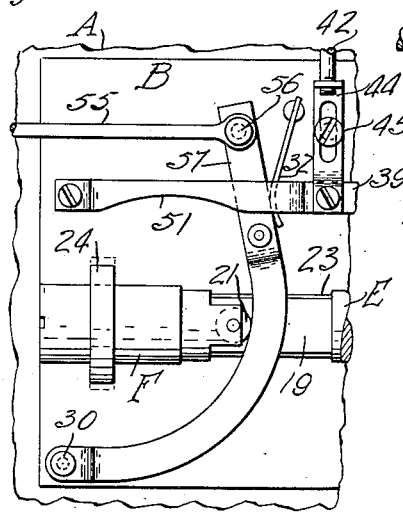
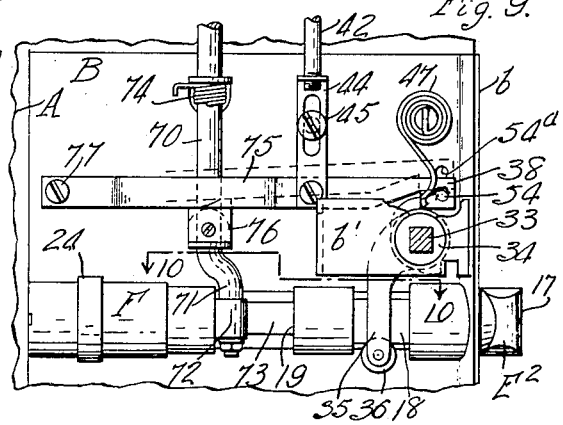
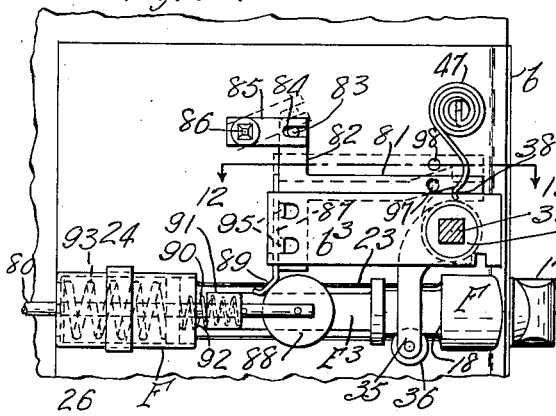
INVENTOR.
John S. Burdick
by Parker & Prochnow
ATTORNEYS Patented July 7, 1931

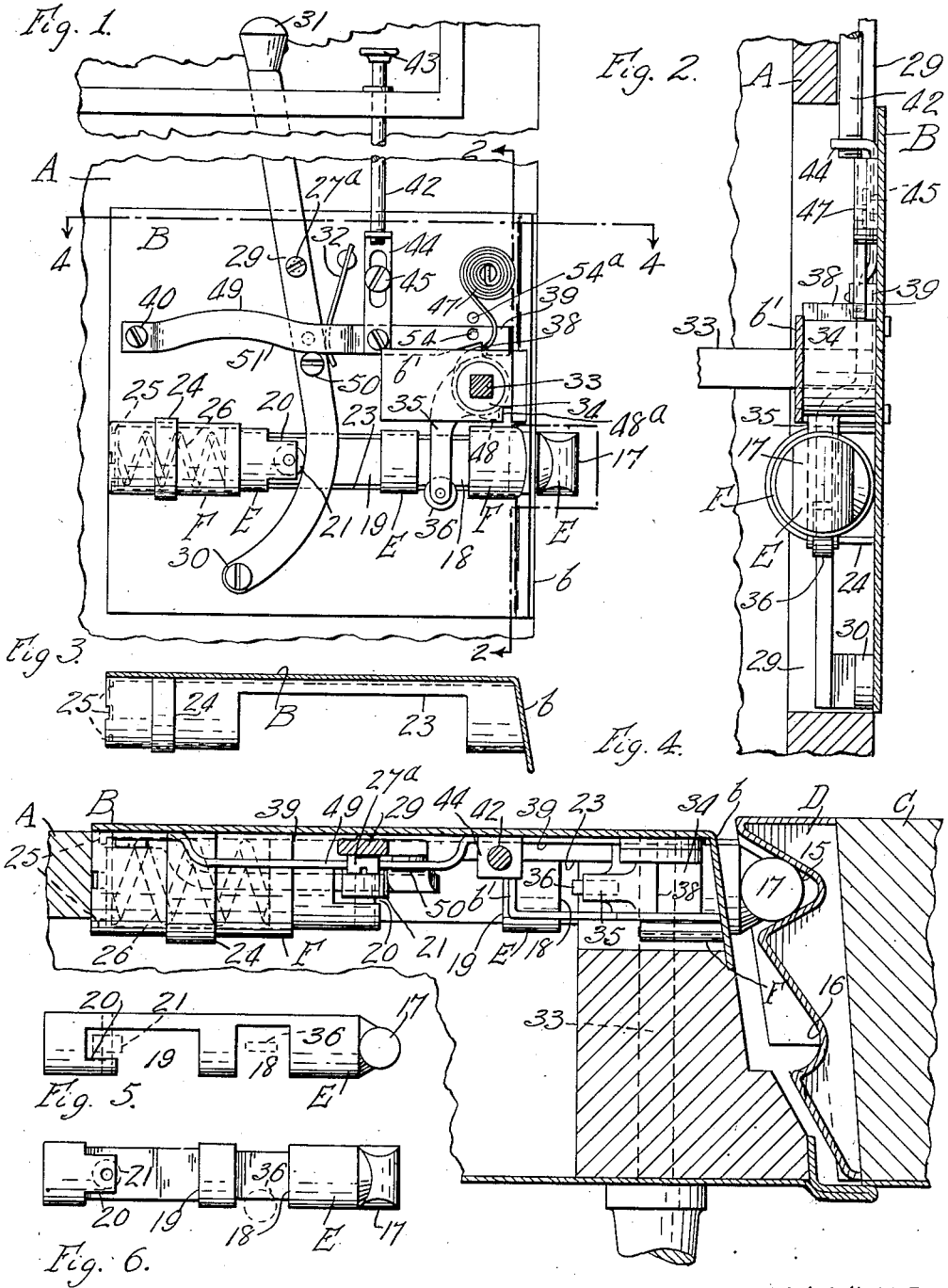

1,812,858

UNITED STATES PATENT OFFICE

JOHN S. BURDICK, OF HAMBURG, NEW YORK

FASTENER FOR DOORS AND THE LIKE

Application filed December 17, 1927. Serial No. 240,914.

This invention relates to improvements in fasteners for the doors of vehicle bodies.

The objects of this invention are to provide a fastener of this kind in which the reciprocatory fastening or latch bolt is constructed and arranged to adjust itself to cooperate with the recess in the striking plate or keeper so that a correct bearing of the end of the bolt with the striking plate or keeper is provided at all times; also to provide a fastener of this kind with a bolt which is arranged to swing about its axis for the purpose of alining the end of the bolt with the walls of the recess in the striking plate or keeper; also to provide a bolt of this kind with an end which is so formed that the bolt engages the keeper along lines of contact so as to minimize the wear on the bolt and striking plate or keeper; also to provide a fastener having a bolt of this kind with an improved pull-back handle or lever for withdrawing the bolt from its engagement with the striking plate or keeper; also to provide a fastener of this kind with means of improved construction for preventing the moving of the bolt from fastening engagement with the striking plate or keeper without first unlocking the outside handle; also to improve the construction of door fasteners of this kind in other respects hereinafter specified.

In the accompanying drawings,

Fig. 1 is a side view of a fastening device embodying my invention.

Fig. 2 is a sectional elevation thereof on line 2—2, Fig. 1.

Fig. 3 is a fragmentary, sectional plan view, showing the guide sleeve for the bolt with the bolt and other parts of the fastener removed therefrom.

Fig. 4 is a sectional, plan view thereof on line 4—4, Fig. 1.

Figs. 5 and 6 are respectively a top plan view and a side elevation of the bolt of my improved fastener removed from the other parts of the device.

Fig. 7 is a side elevation of a fastener of slightly modified construction.

Fig. 8 is a central, sectional view of a latch bolt of slightly modified construction.

Fig. 9 is a side view of a fastener of still another modified construction.

Fig. 10 is a fragmentary, sectional view thereof on line 10—10, Fig. 9.

Fig. 11 is a side view of another modified form of my improved fastener.

Fig. 12 is a sectional view thereof on line 12—12, Fig. 11.

Fig. 13 is an enlarged section showing the anti-rattling means on the operating lever.

A represents the door frame and B a supporting plate on which the various parts of the fastener are mounted, the plate B being preferably made of sheet metal and has the outer edge thereof bent at an angle to form a flange $b$ which extends substantially in alinement with the outer edge of the door. C, Fig. 4, is a frame member of the vehicle body adjacent to the door and which is provided with a striking plate or keeper D, that shown having a substantially V-shaped recess 15 in which the end of the bolt engages when in its latched or locking position. If desired, another recess 16 may be provided in which the bolt engages when the door is partly shut.

E represents the bolt of my improved fastener which is provided with an outer end 17 which is preferably curved or partly cylindrical in form, the curved or cylindrical surfaces thereof extending transversely of the length of the bolt. It is desirable that this curved end may turn about the axis of the bolt so that the end 17 of the bolt may properly aline itself with the slot 16 in the keeper, and the turning of the end of the bolt may be arranged for in any suitable or desired manner. In the form of my invention as illustrated, the entire bolt is adapted to turn about its axis, and for this purpose the bolt is provided with bearing portions which are substantially cylindrical in shape so that the bolt may turn about its axis. The curved end 17 of the bolt is of such diameter that this end 17 cannot enter or seat in the bottom or apex of the V-shaped recess 15, but seats at a distance from the bottom thereof, as is clearly shown in Fig. 4. By means of this arrangement, the door is held against movement in either opening or closing direction when the bolt engages in the recess 15 and as the end of the bolt and the recess wear, the bolt will still continue to hold the door from swinging in either direction due to the spring pressure acting on the bolt to move the same outwardly. The engagement of the end 17 of the bolt in the recess 15 permits up and down movement of the bolt in the recess, so that in case of a shifting of the door relatively to the body of the vehicle, the fastener will continue to function and movement of the door relatively to the body due to shocks or vibrations of the vehicle will be compensated for by the vertical movement of the bolt in the recess 15, so that no strains on the fastener or parts of the body result. The bolt E, as will be hereinafter described, is so mounted on the fastener as to permit this bolt to rotate to a limited extent about its axis and consequently the end 17 thereof always seats itself in the recess 15 in such a manner as to contact along two lines in this recess, the bolt automatically turning about its axis to seat itself in the recess in this manner. This mounting of the bolt is of importance for the reason that it adds considerably to the life of the bolt and keeper by insuring the proper seating of the end of the bolt in the keeper or striking plate at all times, and also has the advantage that the assembling of the fastener and the placing of the same on a car door is greatly facilitated since it is not necessary to have the end of the bolt precisely alined with reference to the striking plate or keeper, or in the event that the striking plate or keeper is not properly installed, the bolt nevertheless will turn about its axis and adapt itself to the striking plate or keeper as installed. The bolt E, as clearly shown in Figs. 5 and 6, is provided with a recess 18 adjacent to the outer end thereof and another recess 19 adjacent to the inner end of the bolt. The recess 19 is provided with an additional longitudinal recess 20, in which an antifriction roller 21 may be pivoted for the purpose hereinafter described.

The bolt E may be guided in its lengthwise movement on the plate B of the fastener in any suitable or desired manner. In the construction shown a tube F is provided for this purpose which is of such size that the bolt E can readily slide lengthwise therein. This tube has a recess 23 cut therein which is of such size as to render the recesses 18 and 19 in the cylindrical bolt accessible through the recess 23. The tube may be secured on the plate B in any suitable or desired manner, for example, the inner end of the tube may be fastened to the plate B by means of a strap 24, the ends of which are welded or otherwise suitably secured to the plate B. The outer end of the tube is preferably inserted into a hole formed in the flange b at the outer edge of the plate B. Any other means for securing the tube on the plate B may be employed, such as welding. The inner end of the tube is preferably either closed or partly closed, for example, by turning the inner ends of the tube F or portions thereof inwardly to form flanges or projections 25 against which the inner end of a coil spring 26 may bear, the other end bearing against the inner end of the cylindrical bolt, thus normally forcing the bolt outwardly into its locking or latching position shown in Figs. 1 and 4.

As is customary in fasteners of this kind some means are provided which are operable from the interior of the vehicle for withdrawing the bolt E from the striking plate or keeper, and for this purpose, in the particular construction shown in Figs. 1 to 4, a bent lever 29 is provided, which is pivoted at 30 on the plate B and which has a knob 31 at the upper end thereof which extends through the window sill of the door or into any other suitable or convenient position for manipulation of the lever. The curved portion of this lever bears on the roller 21 on the bolt and it will be obvious that if the knob 31 is pushed to the left in Fig. 1, the bolt will be withdrawn from its latched position against the action of the spring 26. A spring 32 having one end secured on the plate B engages with its other end the bent lever 29 for the purpose of yieldingly holding the same in engagement with the roller 21 and to prevent rattling of the lever 29, the spring 32 being weaker than the spring 26.

Means may also be provided, if desired, to prevent rattling of the lever 29 by movement thereof transversely to the action or force applied by the spring 32, and for this purpose in the particular construction shown, see particularly Figs. 1 and 13, a spring pressed ball 27 is provided on this lever. This ball is preferably arranged in a cup 27a which may be held in place on the lever 29 by a screw threaded engagement with a threaded hole in the lever 29. This cup contains a spring 28 which normally presses the ball 27 against the plate B and thus holds the lever out of engagement with the plate and yieldingly forces the lever away from the plate B.

The door is also provided with the usual outside handle (not shown) by means of which a shaft 33 may be oscillated. This shaft, which is preferably square or non-circular in cross section, extends through a correspondingly shaped hole in a hub 34, one end of which extends through and is journalled in a hole in a plate b' secured to the plate B and the flange b thereof. This hub has a bent arm 35 rigidly secured thereto or formed integral therewith which arm is preferably provided at its lower end with a roller 36. The lower end of this arm extends into the slot or recess 18 in the bolt and the roller 36 is adapted to engage the rear wall of this recess upon the turning of the shaft 33 and thus force the bolt E backward against the action of the spring 26. It will be noted that the other recess 19 of the bolt is of sufficient size so that the bolt E may be moved rearwardly by the outside handle attached to the shaft 33 without moving the inside door opening lever 29.

The fastener is also provided with means operable at will for locking or preventing the opening of the door from the outside. In the particular construction shown for this purpose the hub 34 on the shaft 33 is provided with an upwardly extending tooth or projection 38 which is adapted to engage in a correspondingly shaped notch in a locking link 39 pivoted at 40 on the plate B. It will be obvious that when this link 39 is lowered into the position shown in Fig. 1, the turning of the shaft 33 in a direction to withdraw the bolt E from its latched position is prevented by the engagement of the tooth 38 in the notch of the link 39. This link may be moved into and out of its locking position in any suitable or desired manner, for example, by means of a rod 42 extending through the window sill of the door and provided at its upper end with a knob 43 and connected to its lower end with the link 39 in any suitable manner, for example, by means of a sheet metal link 44 slidably mounted on the plate B by means of a screw 45 extending through a slot in the link 44. By raising the slide rod 42 the locking link 39 will be raised so that the notch therein is out of the path of movement of the tooth 38. If it is desired to lock the door the rod 42 is depressed, thus causing the tooth 38 to engage in the notch in the locking link 39. 47 represents a coil spring, one end of which is mounted on the plate B and the other end of which engages the tooth 38 for normally holding the door handle connected with the shaft 33 in its proper closing position which position is governed by a tooth 48 on the hub 34, which is urged by the spring 47 into engagement with a stop 48a on the plates B or b'. This locking device is adapted to be operated from the interior of a car, but it will be obvious that other mechanisms for use on a door which is to be locked from the outside may be used in place of that shown.

It is also desirable to provide for the movement of the locking link 39 into its unlocking position when the inside opening lever 29 is actuated and for this purpose, in the particular construction shown, the locking link 39 is offset at 49, as is clearly shown in Fig. 4, to extend around the path of movement of the bent lever 29. The bent lever is provided with a roller 50 which is adapted to engage the underside of the locking link 39 after the bent lever has moved through a limited distance in an unlocking direction, and thus to cause the locking link 39 to be swung upwardly about its pivot 40, causing the notch therein to move out of engagement with the tooth 38. In order to prevent the movement of the lever 29 from raising the locking link 39 to an excessive extent, the under surface of the locking lever may be partly cut away or recessed as shown at 51. Consequently it will be obvious that by swinging the lever 29 about its pivot, the shaft 33 is unlocked and the bolt E is removed from its latching position. The lever 29, because of its position in the recess 19 of the bolt, also serves to limit the extent to which this bolt may turn about its axis.

Means may be provided, if desired, to reduce the friction between the bent lever 29 and the locking link 39, since it is obvious that the spring 28 acting on the ball 27 will normally press the lever 29 against the locking link 39. In the particular construction illustrated for this purpose a bearing ball 52 is provided, which is arranged in a hole or recess 53 in the lever 29, the ball being so arranged as to bear against the face of the locking link 39.

In order that the locking link 39 may be normally held in its unlocking position and prevented from dropping by gravity into a locking position, a boss 54 is preferably formed on the link 39 which extends toward the plate B and is adapted to enter into a recess 54a formed in the plate B. Consequently when the locking link is raised the boss 54 will enter into the recess 54a and thus yieldingly hold the locking plate against falling by gravity into its locking position.

In Figs. 1 to 6 my invention is disclosed as applied to a fastener of the kind intended for a vehicle door in which the fastener is actuated adjacent to the outer end of the door and by means of a swinging lever. In the construction shown in Figs. 7 and 8 my invention is illustrated as used in connection with a remote operated type of door fastener, in which the unlocking and unlatching handle or lever may be provided near the hinged side of the door. Such a handle or lever is not shown in Fig. 7 but is intended to be connected to one end of a rod 55, the other end of which is pivoted at 56 to a swinging lever 57 which is substantially the equivalent of the lever 29 except that the lever 57 is somewhat shorter and does not extend through the window sill of the door. Otherwise the fastener shown in Fig. 7 may be the same as the one shown in Figs. 1 to 6.

In Fig. 8 is shown a construction in which the lever 57 or its equivalent may be entirely omitted. In this figure a fastening bolt E' is shown arranged in a cylindrical tube F', a spring 60 yieldingly holding the bolt in its fastening or latched position. In order to withdraw the bolt, a rod 61 is provided which has a jointed connection with the bolt, the rod shown having an enlargement or ball 62 formed on the end thereof, which is secured in a hole or recess 63 in the inner end of the bolt E'. 64 represents an externally threaded sleeve which engages with corresponding threads in the hole 63 of the bolt E' and holds the ball or enlargement 62 of the rod 61 in connection with the bolt E'. A spring 65 acting on the ball 62 prevents rattling and at the same time permits limited movement of the rod 61 relatively to the bolt E'. The other end of the rod 61 may be pivotally connected to a swinging lever or other device mounted on the hinged side of the door, so that the actuation of the lever or other device causes a pull on the rod 61 which moves the bolt E' out of its locking or latching position.

In many types of vehicle doors the fastener is operated by an upright rod which may be turned through a part of a revolution by means of a handle on the upper end thereof. With my improved fastener it is also possible to use this kind of a fastener operating device, as is shown in Figs. 9 and 10, in which a bolt $E^2$ is employed which is similar to the one described in connection with Figs. 1 to 6. In this construction the bent lever 29, shown in Figs. 1 to 4, is replaced by an upright rod 70, the lower end 71 of which is offset or cranked with reference to the remainder of the rod, as is clearly shown in Figs. 9 and 10, and a roller 72 is provided which is adapted to engage the rear wall of a recess 73 in the bolt $E^2$. A coil spring 74 extending around the rod 70 normally holds this rod in the position in which the bolt $E^2$ may remain in its latching position and also prevents rattling of the rod 70. In order to make it possible for the turning of the rod 70 to cause the unlocking of the door in case the same has been locked by means of a locking link 75 corresponding to the link 39, shown in Figs. 1 to 7, the upright rod 70 is provided with a barrel cam 76 secured thereto, the upper edge of which is adapted to engage with the lower edge of the locking link 75 in such a manner that when the rod 70 is turned to withdraw the bolt $E^2$ from its fastening position, the upper edge of the cam 76 causes the locking link 75 to be swung upwardly about its pivot 77 into the broken line position shown in Fig. 9, and thus release the latch therein from engagement with the tooth 38. Except as described the fastener shown in Figs. 9 and 10 is substantially identical with those heretofore described.

In Figs. 11 and 12 my invention is shown as applied to another type of vehicle door fastener in which the latch is withdrawn by an interior lever or device (not shown) arranged near the hinged side of the door and connected to a rod 80 which extends through an axial hole in the inner end of the fastening bolt $E^3$. In this construction the turning of the shaft 33 of the outside handle is prevented by means of a recess in a locking arm 81 engaging with the tooth 38. The arm 81 is formed integral or rigidly connected with an upright slide member 82 having a pin 83 in the upper end thereof which engages in a slot 84 of an arm 85 secured to a shaft 86 which may be turned by the usual handle (not shown) for locking and unlocking the door from the inside. When the shaft is turned into the full line position shown in Fig. 11, the door is locked against opening from the outside of the vehicle, and when the shaft 86 is turned to swing the arm 85 and the parts connected therewith into the broken line position shown in Fig. 11, the door is unlocked so that it can be unlatched from the exterior of the vehicle. In order to make it possible to unlock the door by means of the remote control lever or device at the same time that the bolt $E^3$ is withdrawn from its locking position, the outer end of the rod 80 is provided with a roller 88 which is adapted to engage with an inclined portion 89 of a member 87 which is preferably integral with the slide member 82 and bent at right angles thereto, and consequently when the wheel or disk 88 is moved to the left in Fig. 11, the inclined portion 89 will be caused to move upwardly, carrying the locking members 82 and 81 with it. In order to make it possible for the wheel 88 to be moved to the left to a limited extent before the bolt $E^3$ is moved into its unlatched position, a spring 90 is provided about the end of the rod 80 and extends into a cup 91 suitably secured on the rod 80. This cup is placed at a distance from the wall 92 in the end of the recessed portion of the cylindrical bolt $E^3$ and upon the movement of the rod 80 to the left in Fig. 11, the spring 90 is compressed without moving the bolt $E^3$ to the left because of the fact that the spring 93 which bears against the inner end of the bolt $E^3$ is of greater strength. This movement permitted by the compression of the spring 90 is sufficient to permit the raising of the locking arm 81, and thereafter the edge of the cup 91 will engage the wall 92 and thus cause the rod 82 to move the bolt $E^3$ to the left in Figs. 11 and 12 into an unlatching position. The guiding of the upright slide member 82 and the flange 89 thereof in their vertical movement may be effected by means of a frame plate $b^3$ having lugs 95 struck out of the plate $b^3$ and turned over as shown in Fig. 12 to confine the flange or member 87 against the end face of the plate $b^3$. Other means for slidably mounting the locking arm 81, slide member 82 and flange 87 on the lock may of course be used, if desired. 97 represents a lug adapted to enter into a corresponding depression 98 in the plate on which the parts of the fastener are mounted, so that the arm will be yieldingly held in its upper or unlocked position.

In all of the constructions described, the latch and locking bolt may adjust itself to the slot 15 in the striking plate or keeper so that an extended bearing between the end of the bolt and the walls of the slot is ensured at all times, even after considerable wear of the bolt and keeper. The constructions described have the advantage of being reliable in operation and comparatively inexpensive to produce, and easier and less costly to install on a door than other fasteners heretofore made because of the fact that great accuracy in installing the fastener is not necessary to the successful operation thereof, the fastener being so constructed that the end of the bolt alines itself with the recess in the striking plate, so that the filing or fitting of the parts is entirely eliminated at the time of installation.

Claims:—

1. A fastener including a bolt adapted to cooperate with a keeper, said keeper being provided with a face extending transversely of the direction of movement of said bolt into its locking position and said bolt being provided with a face adapted to cooperate with a face of said keeper, said face of said bolt being rotatable about the longitudinal axis of the bolt during the fastening operation of said bolt to permit the face of said bolt to aline itself with the face of said keeper along a straight line.

2. A fastener including a bolt adapted to cooperate with a keeper, said keeper being provided with a face extending transversely of the direction of movement of said bolt into its locking position and said bolt being provided with a substantially cylindrical face extending transversely of the axis of the bolt and adapted to cooperate with a face of said keeper to cause said surfaces to engage along a straight line of contact, and means for rotatably mounting said bolt to permit the face of said bolt to aline itself with the face of said keeper.

3. A fastener including a bolt adapted to cooperate with a keeper, said keeper being provided with a face extending transversely of the direction of movement of said bolt into its locking position and said bolt being provided with a convex face having a curvature of a kind which is generated by a straight line and adapted to cooperate with a part only of said transverse face of said keeper, said bolt being provided with a surface cylindrical about its axis, and a bearing for said lock cooperating with said cylindrical surface to permit said bolt to turn about its axis to enable the face on the end thereof to aline with the face of the keeper.

4. A fastener including a bolt adapted to cooperate with a keeper, said keeper being provided with a face extending transversely of the direction of movement of said bolt into its locking position and said bolt being provided with a convex face having a curvature of a kind which is generated by a straight line and adapted to cooperate with a part only of said transverse face of said keeper, said bolt being provided with cylindrical surfaces, a tubular bearing member within which said surfaces cooperate to permit lengthwise movement of said bolt and rotary movement of said bolt about its axis independent of said lengthwise movement into and out of its locking position to aline the face on the end thereof with the face on said keeper.

5. A fastener including a bolt adapted to cooperate with a keeper having a substantially upright bearing surface, said bolt having substantially cylindrical longitudinal surfaces, a tubular housing in which said bolt is mounted to permit the same to move lengthwise and axially, recesses in said bolt, and bolt actuating devices movable in one plane only and extending into said recesses for moving said bolt lengthwise thereof and for limiting the rotation of said bolt about its axis.

6. A door fastener including a bolt, a keeper for said bolt having a V-shaped recess extending transversely of the direction of movement of said bolt into its locking position, the outer end of said bolt having a substantially cylindrical surface extending transversely of the length thereof and adapted to cooperate with said recess and being rotatable about the longitudinal axis of said bolt to aline itself with said recess, and means for moving said bolt into and out of its locking position.

7. A door fastener including a bolt, a keeper for said bolt having a V-shaped recess extending transversely of the direction of movement of said bolt into its locking position, a rounded end on said bolt extending transversely of the length of said bolt and adapted to be wedged between the walls of said V-shaped recess of the keeper, and a cylindrical bearing for said bolt for permitting said bolt to rotate about its axis to aline the surface of the end thereof with the walls of said recess.

8. A fastener including a keeper having an extended upright recess a substantially cylindrical bolt having a recess therein and an outer end to align itself with different portions of said recess in said keeper, a bearing in which said bolt is mounted to move lengthwise and to oscillate about its axis, and a bolt actuating member movable in one plane only and extending into said recess to impart longitudinal movement to said bolt and to limit the turning of said bolt about its axis said recess being formed to permit said bolt to oscillate relatively to said member.

9. A fastener including a supporting plate for the parts thereof having one edge thereof bent to form a flange extending at an angle thereto, a tube extending through a hole in said flange and secured to said plate, said tube having a recess in a side thereof, a substantially cylindrical bolt arranged in said tube to move lengthwise thereof and to turn axially therein and having a recess in registration with said recess in said tube, and bolt actuating means mounted on said plate and extending into said recess for moving said bolt lengthwise in said tube.

10. A fastener including a supporting plate for the parts thereof having one edge thereof bent to form a flange extending at an angle thereto, a tube extending through a hole in said flange and secured to said plate, said tube having a recess in a side thereof, a substantially cylindrical bolt arranged in said tube to move lengthwise thereof and to turn axially therein and having a recess in registration with said recess in said tube, a spring arranged in the end of said tube and bearing against the inner end of said bolt, and actuating devices mounted on said plate and extending into said recess for moving said bolt against the action of said spring and for limiting the extent to which said bolt may turn about its axis.

11. A fastener including a bolt and a keeper having a surface extending transversely with regard to the direction of movement of the bolt into its locking position, the outer end of the bolt being provided with a surface formed to engage said surface of the keeper along a straight line extending transversely of the length of the bolt and oscillatory approximately about the axis of the bolt at all times during the operation of the bolt to enable the end of the bolt to align itself with the surface of the keeper to engage the same along straight lines.

JOHN S. BURDICK.